United States Patent
Bhargava

(10) Patent No.: US 10,280,533 B2
(45) Date of Patent: *May 7, 2019

(54) NYLON BLEND FOR IMPROVED MECHANICAL PROPERTIES OF MONOFILAMENTS AND MULTIFILAMENT FIBERS

(71) Applicant: Shakespeare Company, LLC, Boca Raton, FL (US)

(72) Inventor: Saumitra Bhargava, Clarksville, MD (US)

(73) Assignee: Shakespeare Company, LLC, Boca Raton, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/009,720

(22) Filed: Jun. 15, 2018

(65) Prior Publication Data

US 2018/0298525 A1    Oct. 18, 2018

Related U.S. Application Data

(63) Continuation of application No. 15/802,842, filed on Nov. 3, 2017, now Pat. No. 10,023,978, which is a continuation of application No. 15/115,410, filed as application No. PCT/US2015/013753 on Jan. 30, 2015, now Pat. No. 9,834,868.

(60) Provisional application No. 61/933,997, filed on Jan. 31, 2014.

(51) Int. Cl.
| | |
|---|---|
| *D01F 1/02* | (2006.01) |
| *D01F 6/80* | (2006.01) |
| *D01F 6/90* | (2006.01) |
| *C08G 69/26* | (2006.01) |
| *C08L 77/02* | (2006.01) |
| *C08L 77/06* | (2006.01) |

(52) U.S. Cl.
CPC ............ *D01F 6/90* (2013.01); *C08G 69/265* (2013.01); *C08L 77/02* (2013.01); *C08L 77/06* (2013.01); *C08L 2205/02* (2013.01); *C08L 2205/06* (2013.01); *C08L 2205/16* (2013.01); *D01F 1/02* (2013.01); *D01F 6/805* (2013.01)

(58) Field of Classification Search
None
See application file for complete search history.

(56) References Cited

U.S. PATENT DOCUMENTS

| | | | |
|---|---|---|---|
| 3,393,252 A | * | 7/1968 | Zimmerman .......... C08G 69/00 152/451 |
| 3,553,288 A | | 1/1971 | Oda et al. |
| 3,720,576 A | | 3/1973 | Chayamiti et al. |
| 5,075,168 A | | 12/1991 | Maruyama et al. |
| 5,500,473 A | | 3/1996 | Wissmann |
| 5,618,885 A | | 4/1997 | Kotek et al. |
| 2003/0045641 A1 | | 3/2003 | Akkapeddi et al. |
| 2013/0309928 A1 | | 11/2013 | Deslo et al. |

FOREIGN PATENT DOCUMENTS

| | | |
|---|---|---|
| EP | 0609792 A1 | 8/1994 |
| EP | 1659199 A2 | 5/2006 |
| GB | 918637 A | 2/1963 |
| JP | 2743520 B2 | 4/1998 |
| WO | 2010/132450 A2 | 11/2010 |

OTHER PUBLICATIONS

International Search Report and Written Opinion for PCT/US2015/013753, dated Apr. 9, 2015 (9 pages).
International Search Report and Written Opinion for PCT/US2017/023639, dated Jun. 20, 2017 (16 pages).

* cited by examiner

*Primary Examiner* — Ana L. Woodward
(74) *Attorney, Agent, or Firm* — Eversheds Sutherland (US) LLP

(57) ABSTRACT

A filament comprising a polymer blend and specific articles comprising the filament are disclosed. The polymer blend includes an aliphatic nylon and a semiaromatic nylon. The aliphatic nylon is the major component of the blend and semiaromatic nylon is the minor component of the blend. The aliphatic nylon can be Nylon 6, Nylon 66, Nylon 610, Nylon 612, Nylon 12, and mixtures thereof. The semiaromatic nylon can be 6I/6T, 6T/6I, and mixtures thereof. The nylon blend filament provides enhanced mechanical properties such as modulus, ultimate strength, and yield strength with improved processability and reduced diameter variability at a reduced cost.

20 Claims, 1 Drawing Sheet

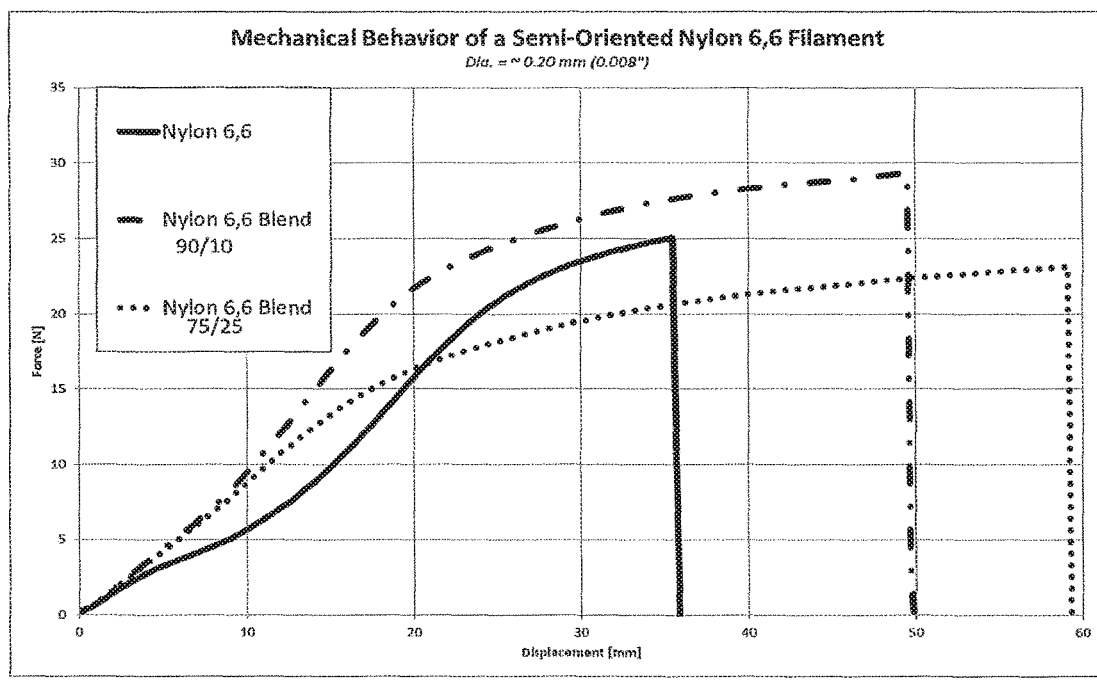

NYLON BLEND FOR IMPROVED MECHANICAL PROPERTIES OF MONOFILAMENTS AND MULTIFILAMENT FIBERS

CROSS REFERENCE TO RELATED APPLICATIONS

This application is a continuation of U.S. application Ser. No. 15/802,842, filed Nov. 3, 2017, which is a continuation of U.S. application Ser. No. 15/115,410, filed Jul. 29, 2016, now U.S. Pat. No. 9,834,868, which is a U.S. National Stage Application of International Application No. PCT/US 15/13753, filed on Jan. 30, 2015, which claims priority benefit of U.S. Provisional Application No. 61/933,997, filed Jan. 31, 2014, each of which is incorporated herein by reference.

FIELD

This application contemplates a filament made from a polymer blend and specific articles comprised of the filament. The filament includes a blend of an aliphatic nylon and a semiaromatic nylon.

BACKGROUND

Currently, there is enormous use of nylon fiber and filament materials all over the world. About 6 million pounds is consumed annually to make clothing, carpets, ropes, luggage, seat belts, filtration fabrics, musical instrument strings, fishing line, and tents, to name a few items. However, many nylon filament materials suffer from low strength, deformability, and high cost. Thus, there is a need to produce a nylon filament having improved thermal and mechanical properties at a low cost.

The present application provides a unique nylon blend filament having surprisingly enhanced mechanical properties such as modulus, ultimate strength, and yield strength with improved processability and reduced diameter variability at a reduced cost.

SUMMARY

A filament that includes a blend of an aliphatic nylon and a semiaromatic nylon is disclosed. The aliphatic nylon is the major component of the blend and semiaromatic nylon is the minor component of the blend. In one aspect, the aliphatic nylon is Nylon 612 and the semiaromatic nylon is 6I/6T copolymer. In another aspect, the filament is Nylon 66 and the semiaromatic nylon is 6I/6T copolymer.

BRIEF DESCRIPTION OF THE DRAWINGS

FIG. 1 illustrates a graph of toughness as defined by the area under the stress-strain curve.

DETAILED DESCRIPTION

This application considers a novel filament made from a nylon blend and specific articles comprised of the filament. More precisely, the filament includes a nylon blend of an aliphatic nylon and a semiaromatic nylon. Surprisingly, the novel fiber and filament described herein has enhanced physical and mechanical properties as compared to an aliphatic nylon filament. In addition, the semiaromatic nylon is 30-40% less costly as compared to aliphatic nylons, so the filament described herein is more economical to produce.

The major component in the blend is an aliphatic nylon and the minor component is a semiaromatic nylon. The aliphatic nylon can be Nylon 6, Nylon 66, Nylon 610, Nylon 612, Nylon 12, and mixtures thereof. The semiaromatic nylon can be 6I/6T, 6T/6I, and mixtures thereof In one embodiment, the semiaromatic nylon is 6I/6T. In another embodiment, the semiaromatic nylon is 6T/6I. The 6I/6T copolymer or 6T/6I copolymer cannot be drawn into a fiber or filament by itself, but a blend with the aliphatic nylon can be drawn and processed readily.

The aliphatic nylon is present in the range of about 70-94% by weight of the blend. In another embodiment, the amount of aliphatic nylon is in the range of about 87-91% by weight. The semiaromatic nylon is present in the range of about 6-30% by weight of the blend. In another embodiment, the amount of semiaromatic nylon is in the range of about 9-13% by weight.

The nylon blend filament can also contain additives mixed in prior to or during extrusion, such as dyes, pigments, optical brighteners, stabilizers and mixtures thereof There is no glass or carbon fiber in the nylon blend filament. The filament can have a diameter in the range of about 0.0025 to about 0.032 inches. The filament can be oriented or partially oriented. In addition, the filament can have a draw ratio in the range of about 2.7 to about 9.

Furthermore, an article can be made of a nylon blend filament, which includes a blend of an aliphatic nylon and a semiaromatic nylon. The article can be made from a monofilament or a multifilament fiber. The article can be a woven or knitted article. In one embodiment, the article can be made from a monofilament or a multifilament fiber comprised of a blend of nylon 66 and nylon 6I/6T.

EXAMPLES

Blends of Nylon Resins

Example 1

Resin 1-HG264SI, high viscosity nylon 612, (Jarden Applied Materials)
Resin 2-ARI90SI, nylon 6I/6T copolymer. (Jarden Applied Materials)

A nylon blend was prepared from 87 parts of Nylon 612 and 13 parts of Nylon 6I/6T in a V-blender and extruded into a monofilament. The equipment used in this process was a 1¼" single screw extruder with two stage drawing and relax capabilities, and three independently controlled ovens. A round monofilament was prepared having a draw ratio of 5.5 and a final filament size of 27. Water quench was set at 75° F.

TABLE 1

| Property | Control (Nylon 612) | Sample (Nylon 612 and Nylon 6I/6T Blend) |
|---|---|---|
| Diameter (in.) | 0.027 | 0.027 |
| Denier | 3606 | 3700 |
| Tensile Strength (N) | 173 | 195 |
| Tensile Stress (Po) | 4.7E+08 | 5.3E+08 |
| Elongation at Break | 16.5 | 19.0 |
| Initial Modulus (Po) | 4.0E+09 | 4.3E+09 |
| Energy to Break Point (N-m) | 4.25 | 5.88 |
| Toughness (Po) | 4.5E+07 | 6.3E+07 |
| Energy to Yield (N-m) | 0.11 | 2.20 |

TABLE 1-continued

| Property | Control (Nylon 612) | Sample (Nylon 612 and Nylon 6I/6T Blend) |
|---|---|---|
| Load at Yield (Yield Stress) (Po) | 8.4E+07 | 4.6E+08 |
| Load at 10% Elongation (N) | 141 | 153 |
| Load at 15% Elongation (N) | 174 | 193 |

As shown in Table 1, one outstanding property of the nylon blend filament is the enhanced initial modulus and yield stress. The nylon blend filament had a yield stress 20-40% higher than that of the Nylon 612 control filament. Having an increase in yield stress makes these filaments or fibers ideal in applications like filtration fabrics, musical instrument strings, lively fishing lines, and high performance fabrics used in luggage and backpacks. Besides the increase in yield stress, the nylon blend filament's mechanical properties, such as initial modulus and tensile strength, were significantly better than those of the aliphatic nylon filament control.

The same filament also showed an improvement in diameter uniformity. A filament roundness improvement of more than about 60% was achieved in comparison to a Nylon 612 control filament. Improved processability and filament cross-section uniformity is crucial to many types of fibers produced with nylon including seat belts, filtration fabrics, tire reinforcement, sewing filaments, and high performance luggage fabrics. Such articles can be knitted or woven.

Yet another enhanced property of the nylon blend filament is a high glass transition temperature. Having a high glass transition temperature means that the filament is not deformed easily and holds its shape well. During the manufacturing of filaments, crimps in the filament can be made by the action of the air jet, the stuffing of the knit, and the deknit process. Such crimps can be intentional or unintentional. If unintentional, the crimp in the filament has to be removed by heating the filament close to the crystallization temperature of the filament.

Aliphatic nylons normally have a glass transition in the range of about 10-45° C., depending on the moisture content of the nylon. However, the 6I/6T copolymer has a glass transition temperature between 130-135° C., which allows the nylon blend filament to maintain its shape until a much higher temperature is reached than a filament comprised of aliphatic nylon alone. Further, the ability to hold higher crimp was greatly increased in the nylon blend filament as compared to the aliphatic nylon filament.

Bulked continuous filaments used for carpets and nylon filament used in fabrics will benefit from higher level of crimp. In each of these processes, ability to develop and retain higher level crimp or even an alternative type of crimp can be desirable. In carpets, higher crimp retention and stability can lead to lower cover weights without sacrificing surface coverage. In the case of nylon fabrics, higher crimp can provide more desirable hand (fabric feel).

In addition to the Nylon 612 blend filament, blends of 6I/6T copolymer with Nylon 66 or Nylon 6 can also address large markets like seat belt yarn, bulked continuous filament and luggage yarns.

Example 2

A commercial extrusion grade nylon 66 manufactured by Nilit Ltd named Polynil P60 and Shakespeare's nylon 6I/6T copolymer named AR190SI were used to make two nylon blends. The blends were prepared by blending the two resins in a defined ratio by weight in a V blender. The blend was extruded into 8 mil monofilament (340 denier) using a single screw extruder, water-filled quench tank, 3 ovens, and 4 roll stands having the process parameters detailed below.

TABLE 2

| | |
|---|---|
| Polymer melt temperature at extruder exit | 520° F. |
| Quench temperature | 150° F. |
| Oven 1 temperature | 315° F. |
| Oven 2 temperature | 340° F. |
| Oven 3 temperature | 400° F. |
| Roll stand 1 speed | 55.4 rpm |
| Initial draw | 3.39 |
| Overall draw | 4.91 |

TABLE 3

| Property | Control (100% Nylon 66) | Sample 1 (Nylon 66:Nylon 6I/6T 90:10) | Sample 2 (Nylon 66:Nylon 6I/6T 75:25) |
|---|---|---|---|
| Modulus (gpd) | 56.5 | 67.3 | 68.0 |
| Tenacity (gpd) | 7.4 | 8.1 | 6.7 |
| Elongation at break (%) | 15 | 18 | 22 |

An unexpected improvement in mechanical properties was observed for the two sample blends as compared to the control which was processed under the same conditions. The stress-strain curve depicted in FIG. 1, below, shows increase in modulus, tenacity and elongation at break for the sample comprised of a 90/10 blend of nylon 66 and nylon 6I/6T copolymer in comparison to the control containing 100% of nylon 66 resin. A second sample comprised of a 75/25 blend exhibits an even higher elongation at break. Overall toughness as defined by the area under the stress-strain curve increased 64% for a 90:10 blend over the nylon 66 control while the 75:25 blend increased 75%, as shown in FIG. 1, below.

Example 4

The nylon blend filament can be used to make many different articles. Several of these articles are listed below in Table 4.

TABLE 4

| Article | Fiber Type | Fiber Description | Formulation |
|---|---|---|---|
| Rope | Multifilament | 1800 denier, 8 dpf | 90% N66, 10% N6I/6T |
| Carpet | Bulked Continuous Multifilament | 1450 denier, 18 dpf | 88% N6, 12% N6I/6T |
| Seat belt | Multifilament | 1800 denier, 8 dpf | 90% N66, 10% N6I/6T |
| Fishing line | Monofilament | 4-20 mil | 83% N6, 5% N66, 12% N6I/6T |
| Musical instrument string | Monofilament | 18-32 mil | 87% N612, 13% N6I/6T |
| Filtration fabric | Monofilament | 6-12 mil | 90% N610, 10% N6I/6T |
| Hook part (of hook and loop fastener) | Monofilament | 8-14 mil | 90% N66, 10% N6I/6T |

TABLE 4-continued

| Article | Fiber Type | Fiber Description | Formulation |
|---|---|---|---|
| Conveyor belt | Monofilament | 10-20 mil | 88% N6, 12% N6I/6T |
| Filament thread | Monofilament | 4-10 mil | 83% N6, 5% N66, 12% N6I/6T |
| Sail | Multifilament | 450 denier, 4 dpf | 88% N6, 12% N6I/6T |
| Awning | Multifilament | 1000 denier, 4 dpf | 88% N6, 12% N6I/6T |
| Harness | Monofilament | 8-14 mil; ribbon cross-section | 90% N66, 10% N6I/6T | dpf: denier per filament;
mil = .001 inches

What is claimed is:

1. A filament, comprising:
   a blend of an aliphatic nylon, a semiaromatic nylon, and optionally one or more additives selected from dyes, pigments, stabilizers, and optical brighteners,
   wherein the aliphatic nylon comprises about 70-94% by weight of the blend and the semiaromatic nylon comprises about 6-30% by weight of the blend,
   wherein the aliphatic nylon is selected from Nylon 6, Nylon 66, Nylon 610, Nylon 612, Nylon 12, and mixtures thereof, and the semiaromatic nylon is selected from 6I/6T copolymer, 6T/6I copolymer, and a mixture thereof,
   wherein the filament displays a yield stress which is from about 20% to about 40% higher than the yield stress of a comparative filament consisting of the aliphatic nylon and optionally the one or more additives, and
   wherein the semiaromatic nylon has a glass transition temperature from 130° C. to 135° C. and the aliphatic nylon has a glass transition temperature from 10° C. to 45° C.

2. The filament of claim 1, wherein the aliphatic nylon comprises Nylon 612 and the semiaromatic nylon comprises 6I/6T copolymer.

3. The filament of claim 1, wherein the aliphatic nylon comprises Nylon 66 and the semiaromatic nylon comprises 6I/6T copolymer.

4. The filament of claim 1, wherein the filament displays an elongation at break of from 18-22%.

5. The filament of claim 1, having a diameter in the range of about 0.0025 to about 0.032 inches.

6. The filament of claim 1, wherein the toughness of the filament is from about 64% to about 74% greater than the toughness of the comparative filament consisting of the aliphatic nylon and optionally the one or more additives.

7. The filament of claim 1, wherein the filament has a draw ratio of from about 2.7 to about 9.

8. An article comprising the filament of claim 1.

9. The article of claim 8, comprising a multifilament fiber that comprises the filament.

10. A fabric comprising the filament of claim 1.

11. A filament, comprising:
    a blend of an aliphatic nylon, a semiaromatic nylon, and optionally one or more additives, wherein the one or more additives are selected from dyes, pigments, stabilizers, and optical brighteners,
    wherein the aliphatic nylon comprises about 70-94% by weight of the blend and the semiaromatic nylon comprises about 6-30% by weight of the blend,
    wherein the aliphatic nylon is selected from Nylon 6, Nylon 66, Nylon 610, Nylon 612, Nylon 12, and mixtures thereof, and the semiaromatic nylon is selected from 6I/6T copolymer, 6T/6I copolymer, and a mixture thereof,
    wherein the filament has a draw ratio of from about 2.7 to about 9
    wherein the filament displays a yield stress which is from about 20% to about 40% higher than the yield stress of a comparative filament consisting of the aliphatic nylon and optionally one or more additives, and
    wherein the semiaromatic nylon has a glass transition temperature from 130° C. to 135° C. and the aliphatic nylon has a glass transition temperature from 10° C. to 45° C.

12. The filament of claim 11, wherein the filament displays a tenacity of at least 6.7 gpd.

13. The filament of claim 11, wherein the aliphatic nylon comprises Nylon 612 and the semiaromatic nylon comprises 6I/6T copolymer.

14. The filament of claim 11, wherein the aliphatic nylon comprises Nylon 66 and the semiaromatic nylon comprises 6I/6T copolymer.

15. The filament of claim 11, wherein the filament displays an elongation at break of from 18-22%.

16. The filament of claim 11, having a diameter in the range of about 0.0025 to about 0.032 inches.

17. The filament of claim 11, wherein the toughness of the filament is from about 64% to about 74% greater than the toughness of a comparative filament consisting of the semiaromatic nylon and the one or more additives.

18. An article comprising the filament of claim 11.

19. The article of claim 18, comprising a multifilament fiber that comprises the filament.

20. A fabric comprising the filament of claim 11.

* * * * *